United States Patent
Becker et al.

(10) Patent No.: US 9,654,321 B2
(45) Date of Patent: May 16, 2017

(54) METHOD FOR RECEPTION IMPROVEMENT OF A FM TUNER IN A COMMON CHANNEL SITUATION

(71) Applicant: Harman Becker Automotive Systems GmbH, Karlsbad (DE)

(72) Inventors: Karl-Anton Becker, Karlsbad (DE); Christoph Benz, Ohlsbach (DE); Philipp Schmauderer, Hofen (DE); Patrick Hamm, Pforzheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 14/997,930

(22) Filed: Jan. 18, 2016

(65) Prior Publication Data

US 2016/0211995 A1 Jul. 21, 2016

(30) Foreign Application Priority Data

Jan. 19, 2015 (EP) .................................. 15151644

(51) Int. Cl.
*H04B 7/08* (2006.01)
*H04B 17/02* (2006.01)
*H04B 1/18* (2006.01)
*H04L 27/14* (2006.01)
*H04H 40/18* (2008.01)

(52) U.S. Cl.
CPC ............... *H04L 27/14* (2013.01); *H04B 7/08* (2013.01); *H04B 7/0828* (2013.01); *H04B 7/0854* (2013.01); *H04B 7/0871* (2013.01); *H04H 40/18* (2013.01); *H04H 2201/13* (2013.01); *H04H 2201/60* (2013.01)

(58) Field of Classification Search
CPC .... H04B 1/126; H04B 7/0825; H04B 7/0845; H04B 7/0871; H04B 7/0888; H04B 7/0894; H04L 1/04
USPC ..... 455/132–135, 150.1, 179.1, 184.1–186.1
See application file for complete search history.

(56) References Cited

U.S. PATENT DOCUMENTS

| | | | |
|---|---|---|---|
| 5,379,046 A * | 1/1995 | Tsujimoto | H04B 1/126 342/378 |
| 6,141,536 A | 10/2000 | Cvetkovic et al. | |
| 6,236,844 B1 * | 5/2001 | Cvetkovic | H04B 7/0857 375/347 |
| 8,265,211 B2 * | 9/2012 | Robert | H04B 1/126 375/148 |
| 9,407,301 B2 * | 8/2016 | Tsujimoto | H04B 7/0865 |

(Continued)

OTHER PUBLICATIONS

Shatara, R., "Dual Receiver with Phase and Switched Diversity for Background Processing and Reception Improvement," SAE Technical Paper 2008-01-1059, Apr. 14, 2008, 9 pages.

(Continued)

*Primary Examiner* — Simon Nguyen
(74) *Attorney, Agent, or Firm* — McCoy Russell LLP

(57) ABSTRACT

Embodiments of methods and systems for reception improvement of FM tuners are provided. An example method according to the disclosure includes receiving one or more FM broadcast signals in a common channel (Co-C) situation and provides for receiving one or more FM broadcast signals, selecting a preferred signal and outputting said signal as an IF signal. When a Co-C situation occurs, the method calculates a correlation of the one or more signals and outputs the signal showing a larger consistency value.

16 Claims, 5 Drawing Sheets

(56) References Cited

U.S. PATENT DOCUMENTS

| | | | |
|---|---|---|---|
| 2003/0152173 A1* | 8/2003 | Strolle | H04B 7/0848 375/347 |
| 2004/0198274 A1* | 10/2004 | Lindenmeier | H04B 7/0805 455/130 |
| 2005/0276365 A1* | 12/2005 | Gierl | H04B 7/0817 375/355 |
| 2008/0188183 A1 | 8/2008 | Dwyer et al. | |
| 2011/0169684 A1* | 7/2011 | Margolin | G01S 5/12 342/30 |
| 2011/0306313 A1* | 12/2011 | Jaisimha | H04H 20/22 455/185.1 |
| 2012/0105284 A1* | 5/2012 | Anandakumar | G01S 19/246 342/357.59 |
| 2013/0115903 A1* | 5/2013 | Kroeger | H04B 7/0845 455/193.1 |
| 2014/0219142 A1* | 8/2014 | Schulz | H04L 5/14 370/280 |

OTHER PUBLICATIONS

European Patent Office, Extended European Search Report Issued in Application No. 15151644.0, Jul. 6, 2015, 6 pages.

* cited by examiner

METHOD FOR RECEPTION IMPROVEMENT OF A FM TUNER IN A COMMON CHANNEL SITUATION

CROSS REFERENCE TO RELATED APPLICATIONS

The present application claims priority to European Patent Application No. 15151644.0, entitled "METHOD FOR RECEPTION IMPROVEMENT OF A FM TUNER IN A COMMON CHANNEL SITUATION," and filed on Jan. 19, 2015, the entire contents of which are hereby incorporated by reference for all purposes.

FIELD

The present disclosure relates to a method for reception improvement of a FM tuner in a common channel situation.

BACKGROUND

Nowadays vehicles, in particular, automobiles are usually equipped with car radios. While these units may combine many more functions such as infotainment systems, telematic systems, vehicle-to-vehicle and in vehicle-to-infrastructure systems, support and emergency systems, integrated hands-free cell phones, wireless safety communications, automatic driving assistance systems, mobile data, etc., the FM radio function still plays a significant and important role in such systems. FM broadcasting is a VHF broadcasting technology which uses frequency modulation, FM, to provide high-fidelity sound over broadcast radio. According to the International Telecommunication Union, ITU, the term VHF designates the range of radio frequency electromagnetic waves from 30 MHz to 300 MHz. In the following, the description will mostly refer to FM car radio and/or portable FM radios, knowing that such a radio may be combined with a plurality of the other elements mentioned above. In the following, any mentioning of a car radio and/or portable FM radio should, in particular, include a FM car radio and FM portable radio. In the following, the terms (radio) tuner and (radio) receiver are used synonymously, as only the radio tuning aspect is concerned, not the amplification or audio/sound aspect.

SUMMARY

Basically all modern FM radios, in particular car radios, to at least some extent use the Radio Data System, RDS. RDS represents a communications protocol standard for embedding small amounts of digital information in conventional FM radio broadcasts. RDS usually is intended for application for VHF/FM sound broadcasts in the frequency range of 87.5 MHz to 108.0 MHz, which may carry either stereophonic, pilot-tone system, or monophonic programs. RDS typically aims at providing improved functionality for FM tuners/receivers such as program identification, program service name display, and possibly automatic tuning for portable and car radios. Radio Broadcast Data System, RBDS, is the official name used for the U.S. version (North America version) of RDS, whereas the two standards are only slightly different. In the following, the abbreviation RDS should encompass also RBDS, if not explicitly noted otherwise. One of the data of RDS and RBDS is the PI, program identification, code. This is a unique code that identifies a station. Every station receives a specific code with a country prefix. Where the RBDS is applied, the PI code is determined by applying a formula to the station's call sign. The PI code consists of 16 bits and is usually referred to by four hexadecimal characters, or nibbles. The PI code uniquely identifies a program service, within a particular geographical area, where broadcasts sharing the same PI code are guaranteed to be carrying identical program audio. Although there are many designs possible for an RDS receiver, evaluation of the PI code is fundamental to operation. In any receiver with preset memories, it is essential for the PI code of the broadcast to be stored in nonvolatile memory when a service is assigned to a memory location. If no signal with the correct PI code is available, on the last tuned frequency or AFs, when a preset is chosen, the receiver should scan the FM band, stop on each receivable RDS service and evaluate the PI code. The PI code is a hexadecimal code which as such usually is not displayed by the tuner/receiver.

Another element of modern radio equipment, especially when used mobile equipment such as in moving cars etc., are multi antenna setups. One of the problems a tuner/receiver in a vehicle faces are dropouts due to multi-path reception. A signal sent by a transmitter and received by a receiver may take a direct path to the receiver or it may be reflected by some reflecting surface such as walls. Typically, the reflected signal travels a longer way than the direct signal. When arriving at the receiver, these signals result in a weakening, or at worst, a dropout of the resulting signal. This situation is improved when using more than one antenna for one receiver. For instance, if the signal arriving at the first antenna is largely reduced or cancelled by a reflected signal, for example, a multi-path signal, the signal at a second antenna, which is placed sufficiently far away from the first antenna, may be strong enough such that the receiver might be able to produce an acceptable audio signal. The spacing between the two antennas must be at least ½ wavelength of the corresponding operating frequency to provide that reception at these antennas is uncorrelated. This type of reception is also called "diverse reception" or "diversity reception". A further improvement of this is for using separate receivers, one per antenna and having the output signal of both receivers analyzed and possibly combined by a phase diversity processor. This situation corresponds to receiving one signal with two antennas each having one receiver per antenna. The phase diversity processor receives both signals from the receivers and may use an adaptive algorithm to combine these signals. If the signal of one of the antennas shows some deficiencies, these deficiencies may be taken care of by the respective algorithm. Additionally or alternatively the system may switch so as to use only one of the two outputs from the receivers. Such a system is shown in FIG. 1. FIG. 1 shows two antennas A1 and A2 of a system using phase diversity. The signal received by the antennas A1 and A2 is sent to receivers 1003.1 and 1003.2, respectively. The output of both receivers 1003.1 and 1003.2 is sent to phase diversity processor 1005. The phase diversity processors may then combine the two signals by using an adaptive algorithm. This works best, if both antennas 1003.1 and 1003.2 receive (nearly) the same modulations broadcasted by a broadcast transmitter.

Phase diversity may be computed by using known phase diversity algorithms as are described, e.g., in a technical review by Shatara, R., SAE publication 28 Jan. 1059, Detroit, Mich., April 2008. However, the setup as shown in FIG. 1 may have problems in common channel situations. Common channel situations, also called co-channel situations, refer to the situation where two different modulations broadcasted from two different points hit the system. Common channel interference thus may be described as crosstalk from two different radio transmitters using the same frequency. There may be several causes of common channel radio interference. One of these may be an overly-crowded radio spectrum: In some populated areas, there is little "free" room left in the radio spectrum. Stations may be very closely packed, such that situations may occur in which a user may hear two or even more stations on the same frequency, at once. Thus despite transmitter site planning it may happen that at one location two or more different broadcast programs, for example, modulations may be received on one frequency. Having two or more antennas, one of the antennas may receive one broadcast program; the other may receive another broadcast program, depending on which transmitter is nearer to the respective antenna. In this case, the phase diversity system may not be able to combine the two signals from either antenna/receiver pair for obvious reasons, since this would mean combining different broadcast programs. In this case the system may toggle back and forth between the different broadcast modulations. This may result in a very annoying listening experience for the user.

In view of the above-mentioned problems it is an object of the present disclosure to provide a method for increasing the performance of the FM reception of radio tuners, in particular portable tuners or car radio tuners. The above-mentioned is addressed by a method for reception improvement of a FM tuner receiving at least a first and a second FM broadcast signal, in a common channel, Co-C, situation, comprising the steps of: providing a first and a second FM front-end; for outputting a first signal and a second signal, respectively, corresponding to the received first and second FM broadcast signals; selecting a currently preferred signal based on the first and the second signal; outputting the currently preferred signal as an intermediate frequency, IF, signal; providing a previously preferred signal by delaying the currently preferred signal; and wherein selecting the currently preferred signal based on the first and the second signal comprises determining if a Co-C situation has occurred and in case it is determined that a Co-C situation has not occurred determining a first phase diversity comprising first phase diversity parameters based on the first and the second signal; and selecting the currently preferred signal based on the result of the first phase diversity; and in case it is determined that a Co-C situation has occurred, calculating a first correlation of two input signals, wherein a first input signal is based on the previously preferred signal and a second input signal is based on the first signal, and calculating a second correlation of two other input signals, wherein a first other input signal is based on the previously preferred signal and a second other input signal is based on the second signal, and selecting the currently preferred signal of the first and the second signal based on which of the first and the second correlations shows a larger consistency value. For each of the first and the second correlations calculated, a correlation value ranges between 0 and 1, where 0 denotes the least consistency, e.g., the corresponding signals are not consistent, whereas a value of 1 denotes the maximum consistency, e.g., the corresponding signals are consistent. It should be understood, that if required, several copies of otherwise identical output signals may be provided.

When the Co-C situation occurs, one of the two FM front-ends may receive a stronger signal from a first FM broadcast whereas the other may receive a stronger signal from another, here, a second FM broadcast. A change from a normal, non-common channel situation, which would be the usual reception situation, over to a Co-C situation may occur rather abruptly. When the Co-C situation occurs, a previously preferred signal at the end of the delay line will still be available. That is due to the delay, the output signal of the delay line does not yet reflect the Co-C situation, which is reflected by the name previously preferred signal. This provides the advantage of providing the possibility to compare the previously preferred signal with either of the two signals provided by the first and second FM front-end, respectively. These signals each reflect already the common channel situation. The comparison is provided by determining two correlations, e.g., correlating the first and the second signal each with the previously preferred signal. For each correlation a consistency value is determined. The result, e.g., the correlation which shows the greater consistency should be selected as the single antenna only, e.g., the signal of the corresponding FM front-end should be selected. Thereby, frequent switching of the audio signal may be avoided. As long as the Co-C situation persists, no phase diversity needs to be taken into account. Once it is determined that the Co-C situation is no longer present, switching back to calculating of and taking into account phase diversity will resume. The above method may require moderate computational resources. It assumes that in a common channel situation one signal is received stronger at one antenna, and the other signal is received stronger at the other antenna. For a more complex situation, the following method is provided.

The above-mentioned problem is also addressed by a method for reception improvement of a FM tuner receiving at least a first and a second FM broadcast signal, in Co-C situations comprising the steps of: providing a first and a second FM front-end; for outputting a first signal and a second signal, respectively, corresponding to the received FM broadcast signals; selecting a currently preferred signal based on the first and the second signal; outputting the currently preferred signal as a IF signal; wherein selecting the currently preferred signal based on the first and the second signal comprises determining if a Co-C situation has occurred and in case it is determined that a Co-C situation has not occurred determining a first phase diversity comprising first phase diversity parameters based on the first and the second signal; and selecting the currently preferred signal based on the result of the determined first phase diversity; and in case it is determined that a Co-C situation has occurred, selecting the currently preferred signal based on the result of the determined first phase diversity and by allowing a continuous change of the first phase diversity parameters.

In the above method, the front-ends comprise two antennas on two different locations. These antennas are de-correlated antennas. In a Co-C situation, the phase diversity calculation faces the following problem. Phase diversity calculation is performed according to phase diversity algorithms including a set of phase diversity parameters, here called first phase diversity parameters. These parameters will provide phase diversity correction taking into account the signals from either FM front-end. A high probability exists that a set of phase diversity parameters/phase correction parameters is found which combine the signals from both front-end in a way which would give preference to one of the signals, whereas another set of phase diversity parameters may be found which would give preference to the other one of the signals. The capture ratio of the demodulator provides for the suppression of the respective other signal. Since the calculating of the phase diversity algorithm may not distinguish between the different signal sources, e.g., the underlying broadcast programs; it will switch to the strongest of the signal sources without providing an audible interference noise. Thus, sudden switching may occur. Thus, for a Co-C situation, a solution is to avoid sudden switching from one source signal, e.g., one FM front-end, to the other FM front-end by only allowing a continuous change of the phase diversity parameters determined. No abrupt switching to another parameter set is allowed, such that frequent switching between different audio signals is avoided and the reception condition will be improved and will be audible to the user.

The method as described above may further comprise: providing a previously preferred signal by delaying the currently preferred signal; and wherein selecting the currently preferred signal based on the first and the second signal further comprises in case it is determined that a Co-C situation has occurred calculating a first correlation of two input signals, wherein a first input signal is based on the previously preferred signal and a second input signal is based on the first signal, and calculating a second correlation, wherein the second correlation is based on two other input signals, wherein a first other input signal is based on the previously preferred signal and a second other input signal is based on the second signal, and selecting the currently preferred signal of the first and the second signal based on which of the first and the second correlations shows a larger consistency value.

In addition to the avoiding of abrupt switching to another parameter set, it may be provided to secure that the calculated phase diversity would be locked to the correct modulation. Therefore in order to lock to the correct modulation, a previously preferred signal may be provided as described above. Then this provides the possibility to compare the previously preferred signal with either of the two signals provided by the first and second FM front-end, respectively. These signals each reflect the common channel situation. The comparison is provided by determining two correlations, e.g., correlating the first and the second signal each with the previously preferred signal. For each correlation a consistency value is determined. The result, e.g., the correlation which shows the greater consistency should be selected for the additional locking to the correct modulation, e.g., selecting the signal from that FM front-end which corresponds to the correlation showing the greater consistency. Thereby, a further condition is provided for selecting the correct modulation in a Co-C situation.

The method as described above may further comprise determining if a Co-C situation has occurred comprises cross-correlating the first and second signal and in case the cross-correlating shows that the first and second signal are uncorrelated, determining that a Co-C situation has occurred. A Co-C situation may be determined by cross-correlating the first and second signal. This may be achieved by applying a cross-correlation function. A cross-correlation function typically may be used for analyzing the similarity of two signals at different times. In case one of the signals is basically the same as the other but only shifted with respect to the other signal by some time T, a properly normalized cross-correlation function would yield a value of 1 or close to 1. However, if the two signals bear hardly any resemblance, e.g., they are uncorrelated; the cross-correlation function would yield a value of 0 or close to 0. In a Co-C situation, two unrelated and uncorrelated signals are received by one FM front-end. Thus a value of the cross-correlation function of 0 or close to 0 indicates that a Co-C situation has occurred.

The method as described above may further comprise determining if a Co-C situation has occurred comprises: determining a second phase diversity comprising second phase diversity parameters, based on the first and the second signal; wherein the second phase diversity parameters are different from the first phase diversity parameters; and selecting another currently preferred signal based on the result of the second phase diversity; cross-correlating the currently preferred signal and the other currently preferred signal and in case the cross-correlating shows that the currently preferred signal and the other currently preferred signal are uncorrelated, determining that a Co-C situation has occurred.

The determining of a second phase diversity provides for using a second set of phase diversity parameters which are different from the first set of phase diversity parameters. In case of a common channel situation, it is possible to find at least two sets of phase diversity parameters which provide only low amplitude modulation at the combined antenna signal provided by the respective first or second phase diversity calculation. Thus to determine that a Co-C situation has occurred, both of the results of either of the phase diversity calculations should be cross-correlated. This may be achieved by applying a cross-correlation function, as described above. The cross-correlation function typically may now be used for analyzing the similarity of the two results of the two phase diversity calculations. If the two results bear hardly any resemblance, e.g., they are uncorrelated; the cross-correlation function would yield a value of 0 or close to 0. Thus, a Co-C situation may be determined if the cross-correlation function of the two results yields a value of 0 or close to 0, whereas if the value of the cross-correlation function is substantially different from 0, no Co-C situation has occurred.

In the method as described above, calculating a first correlation of the two input signals may comprise calculating an auto correlation function of the two input signals; and wherein calculating a second correlation of the two other input signals comprises calculating an auto correlation function of the two other input signals. As compared to the cross-correlation function, above, the auto correlation function compares the same signal at different times, e.g., the correlation is performed under the assumption that the signal would be the same but is merely shifted in time. In other words, auto correlation, also known as serial correlation, represents the cross-correlation of a signal with itself. Loosely speaking, it represents the similarity between observations as a function of the time lag between them.

The method as described above may further comprise the step: providing a predetermined threshold for the consistency value for the calculating of the first correlation of the two input signals and the second correlation of the two other input signals, respectively; in case both the consistency value of the first and the second correlations are below the predetermined threshold and in case the FM broadcast signals includes RDS data, switching at least one of the FM broadcast signals to an alternative frequency in accordance with the RDS PI code. The correlation of the two input signals may be quantified by comparing the consistency value of the respective correlation with a predetermined threshold. In case of very bad conditions, e.g., the wrong modulation is stronger than the required modulation on both antennas; it may be possible for the system to switch to an alternative frequency, provided such a frequency is available. RDS data is usually available in almost all modern FM systems and the PI code may provide for indicated alternative frequencies for a specific broadcast signal. The consistency value should be considered in the context of the overall signal quality to fasten a possible frequency switch.

Thus, a bad correlation value should reduce the quality level and the reliability of RDS, such that a possible alternative frequency without Co-C situation conditions, albeit possibly with a lower signal strength, may be chosen. Thereby even a very difficult reception situation with Co-C conditions may be resolved.

The present disclosure also provides a system for reception improvement of an FM tuner receiving at least a first and a second FM broadcast signal, in a common channel, Co-C, situation, the system comprising: an FM tuner comprising at least two antennas and two FM front-ends, one per antenna, configured to output a first signal and a second signal, respectively, corresponding to the received first and second FM broadcast signals; a Digital Signal Processor, DSP, comprising: a first phase diversity processor configured to determine a first phase diversity comprising first phase diversity parameters based on the first and the second signal; and configured to select the currently preferred signal based on the result of the first phase diversity if a Co-C situation has not occurred; a delay line configured to delay the currently preferred signal and to provide the delayed currently preferred signal as a previously preferred signal; a first correlation unit configured to calculate a first correlation of two input signals, wherein a first input signal is based on the previously preferred signal and a second input signal is based on the first signal, if a Co-C situation has occurred; a second correlation unit configured to calculate a second correlation based of two other input signals, wherein a first other input signal is based on the previously preferred signal and a second other input signal is based on the second signal, if a Co-C situation has occurred; and a controller configured to select the currently preferred signal of the first and the second signal based on which of the first and the second correlations shows a larger consistency value, if a Co-C situation has occurred. The advantages of the system are essentially the same as for the corresponding method described above.

The disclosure also provides a system for reception improvement of an FM tuner receiving at least a first and a second FM broadcast signal, in a common channel, Co-C, situation, the system comprising: an FM tuner comprising at least two antennas and two FM front-ends, one per antenna, configured to output a first signal and a second signal, respectively, corresponding to the first and second received FM broadcast signals; a DSP comprising: a first phase diversity processor configured to determine a first phase diversity comprising first phase diversity parameters based on the first and the second signal; and if a Co-C situation has not occurred configured to select the currently preferred signal based on the result of the first phase diversity; and a controller configured to select the currently preferred signal based on the result of the determined first phase diversity and if a Co-C situation has occurred configured to allow only a continuous change of the first phase diversity parameters. The advantages of the system are essentially the same as for the corresponding method described above.

In the system as described above, the DSP may further comprise a delay line configured to delay the currently preferred signal and to provide the delayed currently preferred signal as a previously preferred signal; a first correlation unit configured to calculate a first correlation of two input signals, wherein a first input signal is based on the previously preferred signal and a second input signal is based on the first signal, if a Co-C situation has occurred; a second correlation unit configured to calculate a second correlation based of two other input signals, wherein a first other input signal is based on the previously preferred signal and a second other input signal is based on the second signal, if a Co-C situation has occurred; and the controller configured to select the currently preferred signal of the first and the second signal based on which of the first and the second correlations shows a larger consistency value, if a Co-C situation has occurred.

In the system as described above, the DSP may further comprise a cross-correlation unit configured to determine if a Co-C situation has occurred by being configured to cross-correlate the first and the second signal are uncorrelated, configured to determine that a Co-C situation has occurred. In the system as described above, the DSP may further comprise a second phase diversity processor configured to determine a second phase diversity comprising second phase diversity parameters, based on the first and the second signal; wherein the second phase diversity parameters are different from the first phase diversity parameters; a cross-correlation unit configured to determine if a Co-C situation has occurred by being configured to cross-correlate the currently preferred signal and the other currently preferred signal and in case the currently preferred signal and the other currently preferred signal are uncorrelated, configured to determine that a Co-C situation has occurred.

In the system as described above, the first correlation unit may be configured to calculate a first auto correlation function of the two input signals; and the system may be configured for calculating a second correlation unit that may be configured to calculate a second auto correlation function of the two other input signals. In the system as described above, the controller may further be configured to compare the consistency value of the first and the second correlations with a predetermined threshold and in case the consistency value of the first and the second correlations is less than the predetermined threshold and in case the FM broadcast signals include RDS data, the controller may be configured to switch at least one of the FM broadcast signals to an alternative frequency in accordance with the RDS PI code. The disclosure further provides an Infotainment system installed in a vehicle, including a system as described above.

Additional features and advantages of the present disclosure will be described with reference to the drawings. In the description, reference is made to the accompanying figures that are meant to illustrate preferred embodiments of the disclosure. It is understood that such embodiments do not represent the full scope of the disclosure.

DETAILED DESCRIPTION

Figure 1:
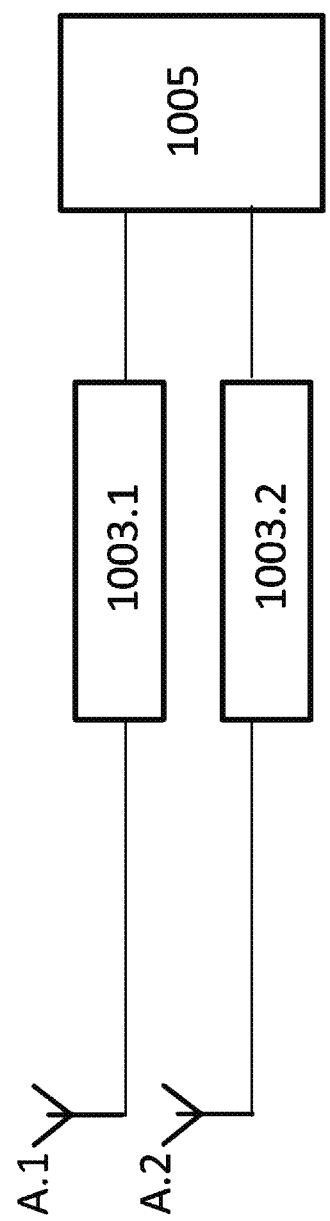
FIG. 1 shows a concept of a known phase diversity system.
Figure 2:
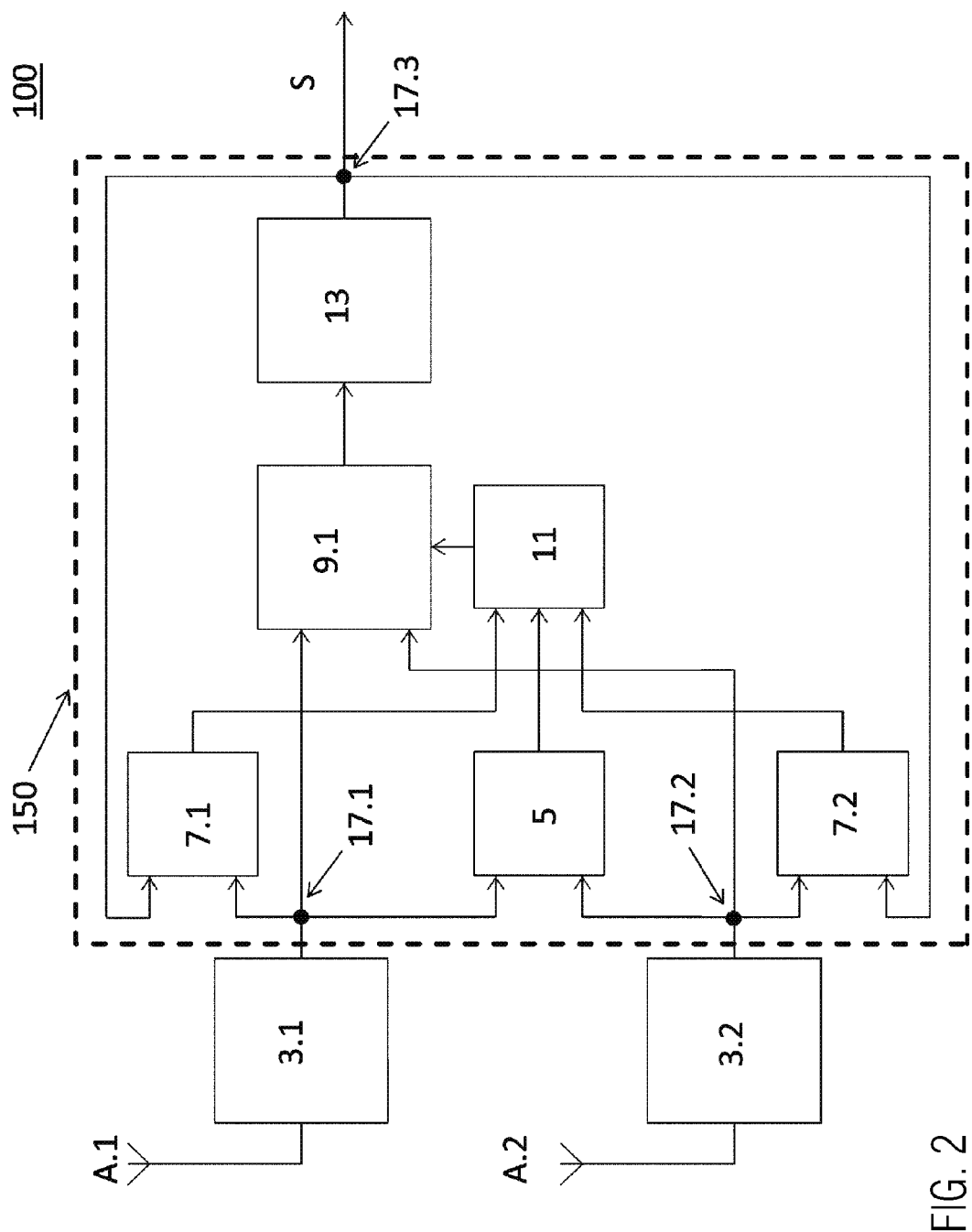
FIG. 2 shows a system for reception improvement of an FM tuner receiving at least a first and a second FM broadcast signal, in a common channel, Co-C, situation, according to an embodiment of the present disclosure.

FIG. 1 shows a system for reception improvement of an FM tuner receiving at least a first and a second FM broadcast signal, in a common channel, Co-C, situation, according to a first embodiment of the present disclosure. FIG. 2 shows a system 100 which may be implemented in a vehicle. The system 100 uses at least 2 antennas, A.1 and A.2 placed at two different locations such that the antennas are de-correlated. The first antenna A.1 and the second antenna A.2 should be spaced apart at least ½ wavelength of the operating frequency, to ensure that the antennas are receiving uncorrelated signals. The first antenna A.1 is connected with a first FM front-end 3.1. The second antenna A.2 is connected with a second FM front-end 3.2. The first and second FM front-ends 3.1 and 3.2 each may comprise an FM tuner/receiver and also an amplifier (not shown). Each FM front-end 3.1 and 3.2 is then connected with a digital signal processor, DSP, denoted as element 150. Here, the output signal of the first and second FM front-end 3.1 and 3.2, may be either digitized directly by the respective FM front-end, 3.1 and 3.2, respectively or else the DSP 150 may comprise a corresponding analog-to-digital converter, e.g., one per input signal.

As is shown in FIG. 2, the DSP 150 may provide several copies of each input signal received from the FM front-ends 3.1 and 3.2 respectively. In FIG. 2, this is achieved by splitters 17.1 and 17.2, respectively. It should be understood that, in principle, FM front-ends 3.1 and 3.2 could also send multiple copies of their respective first and second signal to be input into the DSP 150.

As shown in FIG. 2, the first and the second signal output from the first and the second FM front-end 3.1 and 3.2, respectively, and input to the DSP 150 are input into a phase diversity unit such as a phase diversity processor 9.1. The Phase diversity processor 9.1 calculates a first phase diversity using first phase diversity parameters of a phase diversity algorithm. The phase diversity processor 9.1 then outputs a result of the phase diversity calculation towards an output of the DSP 150. As is shown in FIG. 2, before being output from the DSP 150, the result of the first phase diversity processor 9.1 may be delayed by delay line 13. The resulting signal may then be split by another splitter 17.3, which is substantially similar to splitter 17.1 and 17.2 and serves the purpose of providing several copies of the output of the phase diversity processor 9.1. It should be noted that this only is one possible realization. It would equally be possible to output several signals from the delay line 13. It may also be possible output one copy of the output signal of the diversity processor 9.1 directly, and providing a second copy of the output signal which may then be delayed by a delay line such as delay line 13.

The system 100 as shown FIG. 2 represents a phase diversity system with optimized common channel reception behavior. In order to avoid that the system 100 toggles between different modulations once a common channel situation occurs, the system 100 provides the following additional elements. The DSP 150 comprises a correlation unit 5. The correlation unit 5 computes a correlation of two input signals. In the embodiment depicted in FIG. 2, these input signals are the first and second signal output from the FM front-ends 3.1 and 3.2, respectively, as input to the DSP 150. It should be understood that these signals are digital signals. Once the result of calculating the correlation by the correlation unit 5 shows that the first and the second input signals are uncorrelated, this would indicate that a common channel situation has occurred. That is, one of the at least two received broadcast signals is stronger at one antenna, e.g., A.1, whereas the other broadcast signal received is stronger at the other antenna, A.2. The result of the correlation unit may then be input into a controller 11. The controller 11 controls the phase diversity processor 9.1. In particular, the controller may control the phase diversity processor 9.1 in 5 such a way, that it may or may not calculate a phase diversity of its input signals. Alternatively, the controller 11 may control the phase diversity processor 9.1 to let pass only one of its input signals, for example the first signal or the second signal as are input from the respective FM front-ends 3.1 and 3.2, respectively. It should be understood, that in principle, the controller 11 may also be combined with the phase diversity processor 9.1 as representing one unit.

The correlation unit 5 typically corresponds to a unit being adapted to calculate a cross-correlation function, CCF. A CCF may be defined as follows:

$$R_{xy}(\tau) = \lim_{T_F \to \infty} \frac{1}{T_F} \int_{-T_F/2}^{T_F/2} x(t)y(t+\tau)\,dt;$$

where $R_{xy}(\tau)$ denotes the cross-correlation function for describing the correlation of two different signals x(t) and y(t) as a function of the time difference $\tau$ between the two signals. For digital signals, the cross-correlation function may be computed discretely.

As soon as a common channel situation for the system 100 as shown in FIG. 2 has been detected, another two correlations need to be calculated. These correlations are calculated by correlation units 7.1 and 7.2, respectively. Correlation unit 7.1 may be adapted to calculate a correlation between the delayed known correct signal and the first signal received by antenna A.1 and provided by FM front-end 3.1. Calculation unit 3.2 may be adapted to calculate a second correlation between the delayed known correct signal and the second antenna signal received by antenna A.2 and provided by FM front-end 3.2. The delayed known correct signal corresponds to the previously preferred signal. As long as no Co-C situation has occurred, the phase diversity processor 9.1 provides a currently/presently preferred signal of the first and the second signals as provided by the first and second FM front-ends 3.1 and 3.2, respectively. Once the Co-C situation has occurred, the system 100 quickly will detect the change of the reception situation via the correlation unit 5. Then, however, the previously preferred signal is still available since it was delayed by the delay line 13. It should be noted that while FIG. 2 shows a delay a delay line 13, providing the delay may also be provided by storing the previously preferred signal for a predetermined time, such that it may be available at least as long as said predetermined time has not yet expired.

The calculations performed by the first and second correlation units 7.1 and 7.2, respectively aim at determining which of the signals should be selected as the currently preferred signal. Correlation units 7.1 and 7.2 are adapted to calculate an auto-correlation function. And auto-correlation function corresponds to a cross-correlation function, but cross-correlating the respective signal with itself. This may be expressed by $$\Psi_{xx}(\tau) = \lim_{T_F \to \infty} \frac{1}{2T_F} \int_{-T_F}^{T_F} x(t)x(t+\tau)\,dt;$$

where $\psi_{xx}$ (c) denotes the auto correlation function for describing the autocorrelation of 10 x(t) with itself as a function of the time difference τ. For digital signals, the cross-correlation function may be computed discretely.

Each correlation provided by the correlation units 7.1 and 7.2 yields a correlation result. The result which shows the greater consistency value of the two correlations, e.g., the result of the first correlation calculated by an auto correlation function, and the result of the second correlation calculated by an auto-correlation function, respectively, should be selected as the currently preferred corresponding to one of the two antennas, A.1 and A.2, respectively only. Both correlation units 7.1 and 7.2 each are connected with the control unit/controller 11, such that the result of either auto-correlation function may be compared by the controller. As long as the Co-C situation persists, the controller may control the phase diversity processor 9.1 to select one of the two input signals, e.g., the first signal or the second signal in accordance with the correlation results provided by the correlation units 7.1 and 7.2.

Once it is detected that the Co-C situation no longer persists, the system 100 may switch back to calculating phase diversity, normally. That means, the correlation unit 5 may indicate that the Co-C situation is no longer present. This result may then be communicated to the controller 11. The controller 11 then may control the phase diversity processor 9.1, to resume phase diversity calculation using a phase diversity algorithm.

In the following embodiments, the same items performing the same tasks are denoted with the same reference signs. The embodiment as shown in FIG. 2 uses only moderate DSP resources. However, it works best under the assumption that in a Co-C situation one signal received by one of the two antennas A.1 and A.2 would be stronger at that respective antenna whereas the other signal would be stronger at the other antenna, e.g., A.2, A.1.

Figure 3:
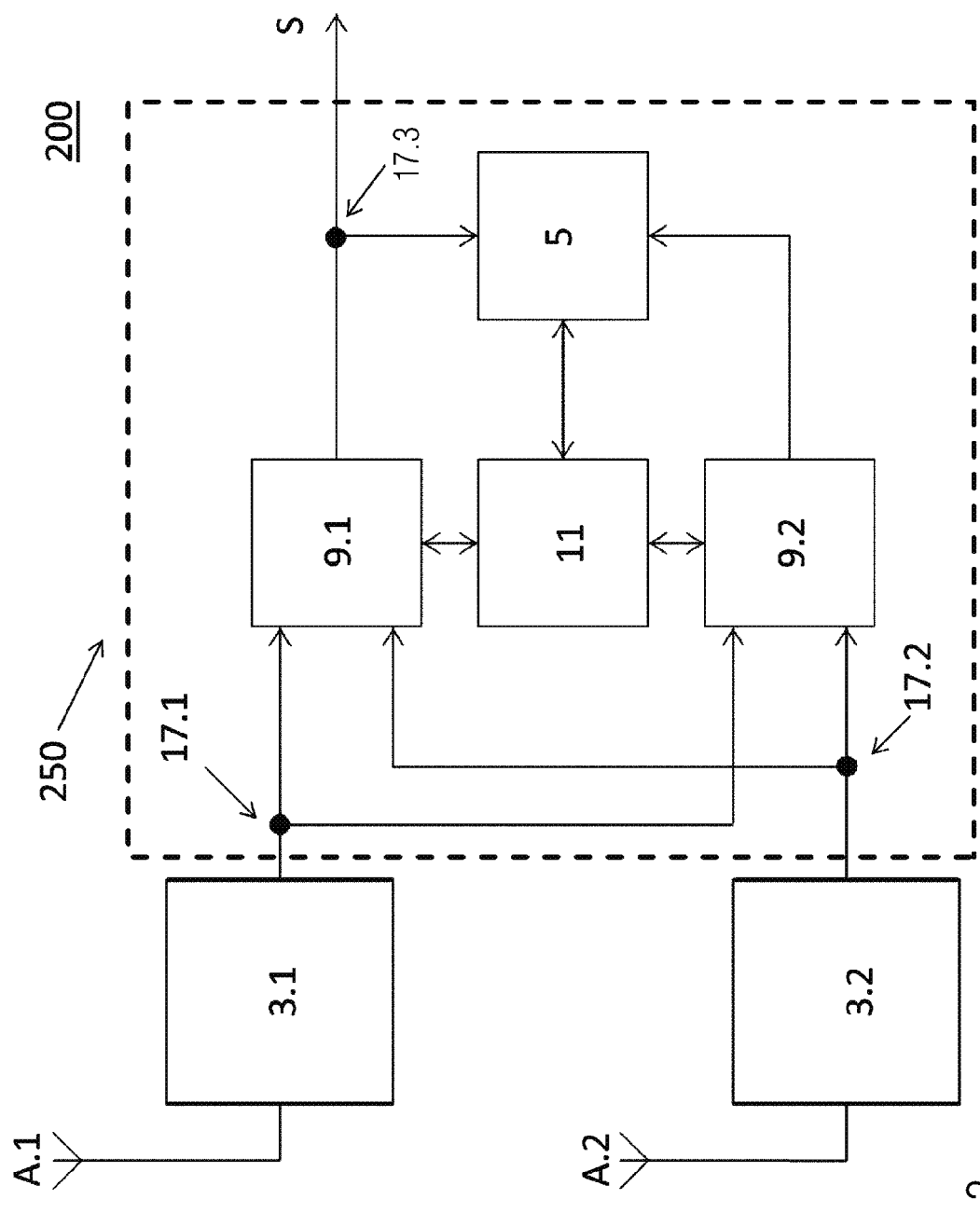
FIG. 3 shows a system for reception improvement of an FM tuner receiving at least a first and a second FM broadcast signal, in a common channel, Co-C, situation, according to a further embodiment of the present disclosure.

A more complex situation is shown in the following embodiment as depicted in FIG. 3. A phase diversity algorithm such as, for example, the CMA algorithm has a high probability to find phase diversity parameters, e.g., such which will solve the underlying optimization problem, for instance minimizing an underlying cost function which may give preference to one of the signals received by one of the antennas A.1 and A.2. However, another solution may be found which may give preference to another combination of parameters which would filter out the other signal of the input signals. The capture ratio of the demodulator provides for the suppression of the other signal, respectively. As the phase diversity algorithm, e.g., as performed by the phase diversity processor 9.1 of FIG. 2, FIG. 3, and FIG. 4 would hardly be able to distinguish different signal sources; it would typically switch to the strongest of both sources without an audible interference noise, which is meant by the term toggling between input signals. However, once a Co-C situation is detected, the phase diversity processor 9.1 may be controlled by a controller 11, in such a way, that a sudden or abrupt switching to another set of the phase diversity algorithm will be prohibited.

FIG. 3 shows a system 200 for reception improvement of an FM tuner receiving at least a first and a second FM broadcast signal, in a Co-C situation, including two FM front-ends 3.1 and 3.2, receiving signals from 2 antennas A.1 and A.2 respectively. The antennas and the front-ends may be the same as shown in FIG. 2. DSP 250 is shown in FIG. 3, receiving input signals from the respective FM front-ends 3.1 and 3.2. A phase diversity processor 9.1 which may be substantially the same as in FIG. 2 is shown, receiving both input signals, e.g., a first signal from the first FM front-end 3.1 and a second input signal from the second FM font end 3.2. It should be understood, again, either the FM front-ends or the DSP 250 would properly digitize the input signals received from the antennas A.1 and A.2, respectively.

The phase diversity processor 9.1 may be adapted to calculate a phase diversity algorithm as described above. FIG. 3 also shows a second phase diversity processor 9.2 which may be substantially similar to the first phase diversity processor 9.1. However the second phase diversity processor 9.2 may be adapted to run a phase diversity algorithm using different phase diversity correction parameters than the first phase diversity processor 9.1. In order to determine if a Co-C situation has occurred, the second phase diversity processor 9.2 may be adapted to determine a second phase diversity using a second set of phase diversity parameters. The input of the second phase diversity processor 9.2 may be the same as the input for the first phase diversity processor 9.1. In accordance with the phase diversity algorithm, the second phase diversity processor 9.2 may calculate a second phase diversity using phase diversity parameters which are different from the first phase diversity parameters of the first phase diversity processor 9.1. Thus, the first phase diversity processor 9.1 and the second phase diversity processor 9.2, respectively, may give preference to different signals, e.g., the resulting currently preferred signal of either of the elements 9.1 and 9.2 may be different. In order to determine whether or not a Co-C situation has occurred, a correlation unit 5 may be provided in FIG. 3, which may calculate a correlation between the results or either of the phase diversity processors 9.1 and 9.2. The correlation unit 5 may be adapted to calculate the correlation by using a cross-correlation function, as was described with regard to FIG. 2. The result of the cross-correlation function may then be communicated from the correlation unit 5 to the controller 11. The controller 11 thus may react if the results of the cross-correlation function indicate that the input signals to the correlation unit 5 would be substantially uncorrelated, thereby indicating a Co-C situation. The controller 11 then may be adapted to control the phase diversity processor 9.1 to prohibit abrupt switching of one parameter set of the phase diversity to another parameter set. In other words, no abrupt switch to another parameter set is allowed. Thus a frequent switch between different audio signals is avoided and the reception condition will be improved and this will be audio to the customer.

Figure 4:
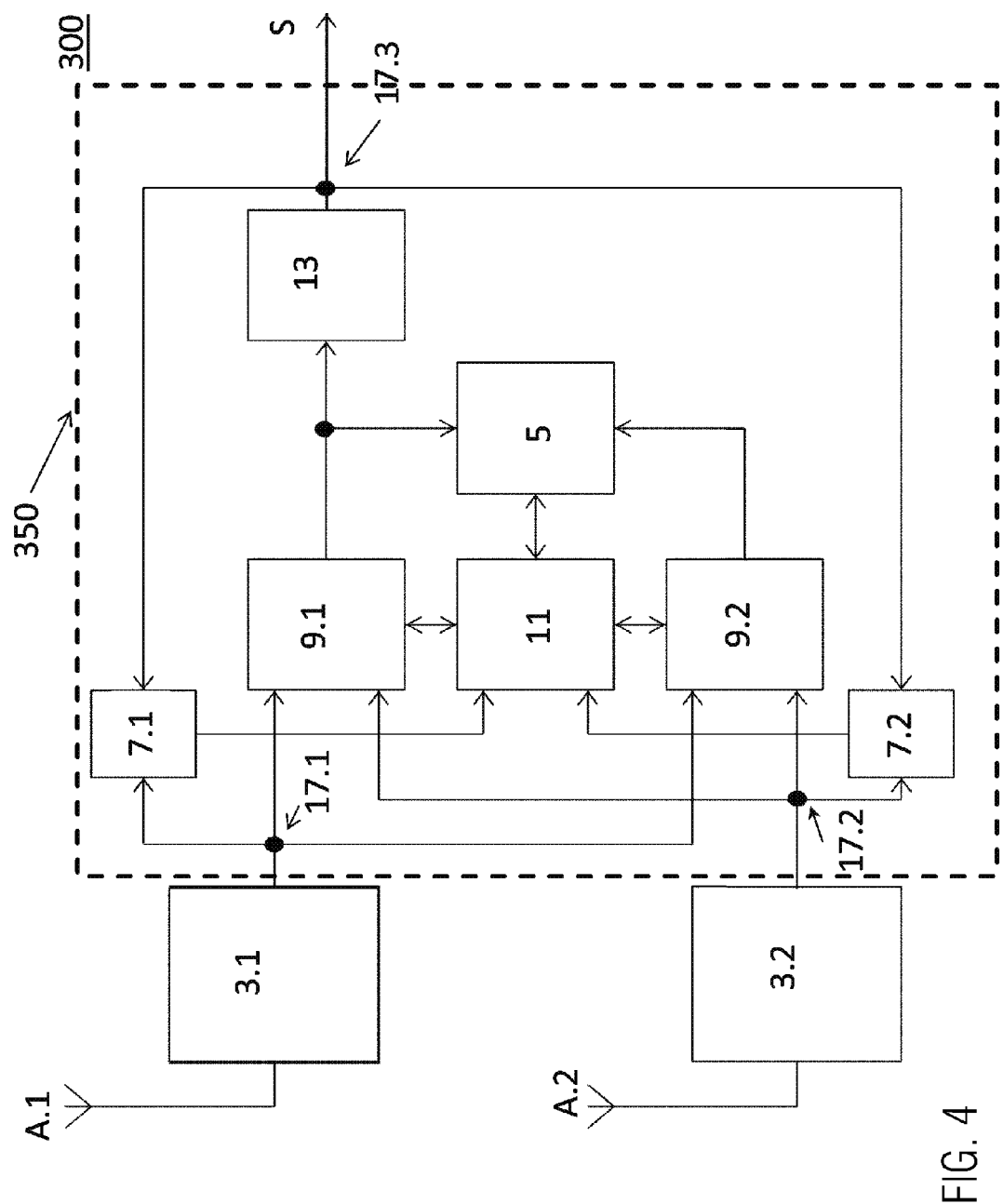
FIG. 4 a system for reception improvement of an FM tuner receiving at least a first and a second FM broadcast signal, in a common channel, Co-C, situation, according to yet another embodiment of the present disclosure.

FIG. 4 shows a system 300 having a combination of the elements of FIG. 3 with elements of FIG. 2. FIG. 4 shows a DSP 350. In order to secure that phase diversity is locked to the correct modulation, an additional condition may be implemented, e.g., in addition to the condition formulated for the system 200 of FIG. 3 that no abrupt switch to another parameter set may occur. FIG. 4 extends this idea by using a delay line 13 and two correlation units 7.1 and 7.2 calculating an auto-correlation function, as were already described with regard to the system 100 shown in FIG. 2. Therefore, FIG. 4 depicts essentially all elements of FIG. 3 and FIG. 2. The selected output signal of the phase diversity processor 9.1, e.g., the currently preferred signal, however may be treated similar as in FIG. 2. That is either a copy of said signal or the signal itself may be delayed using a delay line or delay unit 13. The output of the delay line 13 may be sent by a splitter to an IF signal output as well as to a first correlation unit 7.1 and second correlation unit 7.2, respectively. Similar as in FIG. 2, the respective correlation unit 7.1 and 7.2, respectively, may calculate an auto-correlation of the input signal provided from antenna A.1 and front-end 3.1, as well as the input signal provided from antenna A.2 and front-end 3.2 with the previously preferred signal. Therefore, this provides the advantage to further lock to the correct modulation received by either of the antennas A.1 and A.2, respectively.

In very complicated and bad reception situations, in particular in cases in which on both antennas A.1 and A.2 the wrong modulation is much stronger than the required correct modulation, such a situation may be resolved by using RDS data, in particular the PI code provided by the RDS data. If such data is available and if such data, e.g., the PI code, indicates an alternative frequency for one the broadcast signals, the system may use this alternative frequency. Thus, the consistency value of the respective correlations 7.1 and 7.2 should be considered as indicator of the overall signal quality and to indicate a possible frequency switch, if available. That is, the consistency value of either of the first and second correlation units 7.1 and 7.2, respectively may be compared with a predetermined threshold for the consistency values. If both consistency values are very low, the system may attempt to reduce the quality signal by switching to an alternative frequency. This would then result in lowering the RF level, e.g., the signal strength, but avoiding Co-C channel conditions.

Figure 5:
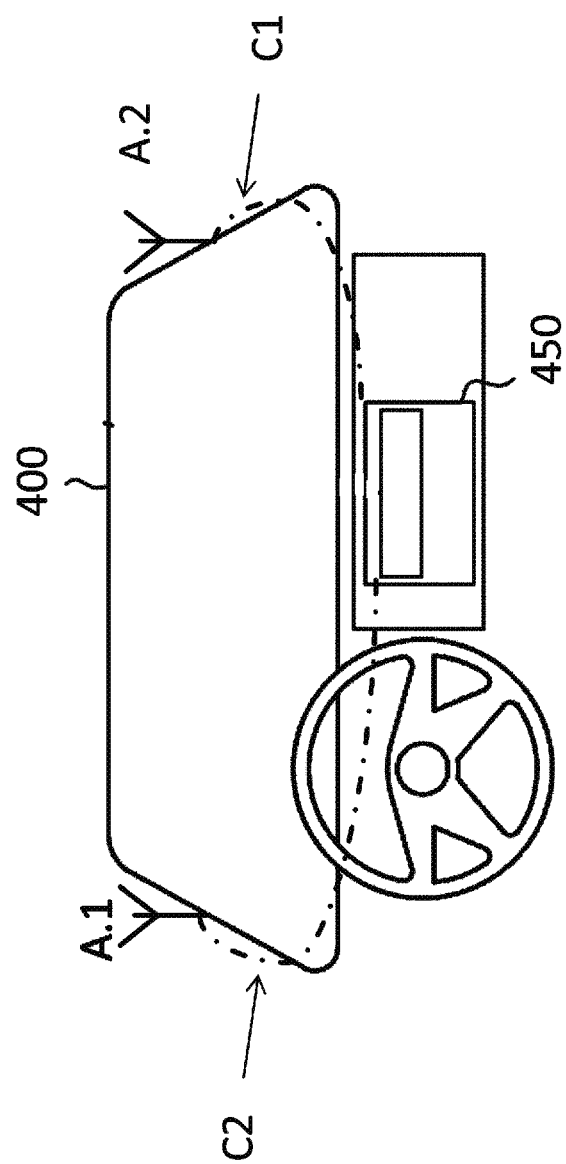
FIG. 5 shows an infotainment system installed in a vehicle, comprising a system for reception improvement of an FM tuner receiving at least a first and a second FM broadcast signal, in a common channel, Co-C, situation, according to one of the embodiments shown in FIGS. 2, 3, and 4.

FIG. 5 provides an example of a system using the above described methods as may be included in a vehicle. FIG. 5 depicts schematically parts of an inside of a vehicle as may be seen from the prospective of the driver. A wind screen 400 in a vehicle is indicated. Antennas A.1 and A.2 of system may be connected with the system 450 as shown in FIG. 5. Connections with wires C1 and C2 are shown just for the purpose of demonstration. Also the antennas A.1 and A.2 may be placed elsewhere in the vehicle, not necessary to the left and the right of the windscreen, respectively. The system 450 may substantially correspond to any of the embodiments as depicted in FIG. 2, FIG. 3, and FIG. 4, respectively.

The disclosure provides for a first example method for reception improvement of a FM tuner receiving at least a first and a second FM broadcast signal, in a common channel, Co-C, situation, comprising the steps of: providing a first and a second FM front-end; for outputting a first signal and a second signal, respectively, corresponding to the received first and second FM broadcast signals, selecting a currently preferred signal based on the first and the second signal, outputting the currently preferred signal as an IF signal, providing a previously preferred signal by delaying the currently preferred signal, and wherein selecting the currently preferred signal based on the first and the second signal comprises determining if a Co-C situation has occurred and in case it is determined that a Co-C situation has not occurred determining a first phase diversity comprising first phase diversity parameters based on the first and the second signal; and selecting the currently preferred signal based on the result of the first phase diversity; and in case it is determined that Co-C situation has occurred, calculating a first correlation of two input signals, wherein a first input signal is based on the previously preferred signal and a second input signal is based on the first signal, and calculating a second correlation of two other input signals, wherein a first other input signal is based on the previously preferred signal and a second other input signal is based on the second signal, and selecting the currently preferred signal of the first and the second signal based on which of the first and the second correlations shows a larger consistency value.

The disclosure provides for a second example method for reception improvement of a FM tuner receiving at least a first and a second FM broadcast signal, in Co-C situations comprising the steps of: providing a first and a second FM front-end; for outputting a first signal and a second signal, respectively, corresponding to the received FM broadcast signals; selecting a currently preferred signal based on the first and the second signal; outputting the currently preferred signal as an IF signal; wherein selecting the currently preferred signal based on the first and the second signal comprises determining if a Co-C situation has not occurred determining a first phase diversity comprising first phase diversity parameters based on the first and the second signal; and selecting the currently preferred signal based on the result of the determined first phase diversity; and in case it is determined that a Co-C situation has occurred, selecting the currently preferred signal based on the result of the determined first phase diversity and by allowing a continuous change of the first phase diversity parameters. In a third example method, one or more of the first example method and the second example method may further comprise providing a previously preferred signal by delaying the currently preferred signal; and selecting the currently preferred signal based on the first and the second signal may further comprise: in case it is determined that Co-C situation has occurred calculating a first correlation of two input signals, wherein a first input signal is based on the previously preferred signal and a second input signal is based on the first signal, and calculating a second correlation, wherein the second correlation is based on two other input signals, wherein a first other input signal is based on the previously preferred signal and a second other input signal is based on the second signal, and selecting the currently preferred signal of the first and the second signal based on which of the first and the second correlations shows a larger consistency value. In a fourth example method, one or more of the first through the third example methods may include that method wherein determining if a Co-C situation has occurred comprises cross correlating the first and second signal and in case the cross correlating shows that the first and second signal are uncorrelated, determining that a Co-C situation has occurred.

In a fifth example method one or more of the first through the fourth example methods may include that method wherein determining if a Co-C situation has occurred comprises: determining a second phase diversity comprising second phase diversity parameters, based on the first and the second signal; wherein the second phase diversity parameters are different from the first phase diversity parameters; and selecting another currently preferred signal based on the result of the second phase diversity; cross correlating the currently preferred signal and the other currently preferred signal and in case the cross correlating shows that the currently preferred signal and the other currently preferred signal are uncorrelated, determining that Co-C situation has occurred. In a sixth example method, one or more of the first through the fifth example methods may include that method wherein calculating a first correlation of the two input signals comprises calculating an auto correlation function of the two input signals; and wherein calculating a second correlation of the two other input signals comprises calculating an auto correlation function of the two other input signals. In a seventh example method, one or more of the first through the sixth example methods may further comprise the step: providing a predetermined threshold for the consistency value for the calculating of the first correlation of the two input signals and the second correlation of the two other input signals respectively; in case both the consistency value of the first and the second correlations are below the predetermined threshold and in case the FM broadcast signals includes RDS data, switching at least one of the FM broadcast signals to an alternative frequency in accordance with the RDS PI code.

The disclosure may further provide for a first example system for reception improvement of an FM tuner receiving at least a first and a second FM broadcast signal, in a common channel, Co-C, situation, the system comprising: an FM tuner comprising at least two antennas and two FM front-ends, one per antenna, configured to output a first signal and a second signal, respectively, corresponding to the received first and second FM broadcast signals; a Digital Signal Processor, DSP, comprising: a first phase diversity processor configured to determine a first phase diversity comprising first phase diversity parameters based on the first and the second signal; and configured to select a currently preferred signal based on the result of the first phase diversity if a Co-C situation has not occurred; a delay line configured to delate the currently preferred signal and to provide the delayed currently preferred signal as a previously preferred signal; a first correlation unit configured to calculate a first correlation of two input signals, wherein a first input signal is based on the previously preferred signal and a second input signal is based on the first signal if a Co-C situation has occurred; a second correlation unit configured to calculate a second correlation of two other input signals, wherein a first other input signal is based on the previously preferred signal and a second other input signal is based on the second signal, if a Co-C situation has occurred; and a controller configured to select the currently preferred signal of the first and the second signal based on which of the first and the second correlations shows a larger consistency value, if a Co-C situation has occurred.

The disclosure may further provide for a second example system for reception improvement of an FM tuner receiving at least a first and as second FM broadcast signal, in a common channel, Co-C, situation, the system comprising: an FM tuner comprising at least two antennas and two FM front-ends, one per antenna, configured to the first and second received FM broadcast signals; a DSP comprising: a first phase diversity processor configured to determine a first phase diversity comprising first phase diversity parameters based on the first and the second signal; and if a Co-C situation has not occurred configured to select a currently preferred signal based on the result of the first phase diversity; and a controller configured to select the currently preferred signal based on the result of the determined first phase diversity and if a Co-C situation has occurred configured to allow only a continuous change of the first phase diversity parameters.

A third example system may include one or more of the first and the second example systems, the DSP further comprising a delay line configured to delay the currently preferred signal and to provide the delayed currently preferred signal as a previously preferred signal; a first correlation unit configured to calculate a first correlation of two input signals, wherein a first input signal is based on the previously preferred signal and a second input signal is based on the first signal, if a Co-C situation has occurred; a second correlation unit of configured to calculate a second correlation based of two other input signals, wherein a first other input signal is a based on the previously preferred signal and a second other input signal is based on the second signal, if a Co-C situation has occurred; and the controller configured to select the preferred signal of the first and the second signal based on which of the first and the second correlations shows a larger consistency value, if a Co-C situation has occurred. A fourth example system may include one or more of the first through the third example systems, the DSP further comprising a cross correlation unit configured to determine if a Co-C situation has occurred by being configured to cross correlate the first and the second signal, and in case the first and the second signal are uncorrelated, configured to determine that a Co-C situation has occurred. A fifth example system may include one or more of the first through the fourth example systems, the DSP further comprising a second phase diversity processor configured to determine a second phase diversity comprising second phase diversity parameters, based on the first and the second signal; wherein the second phase diversity parameters are different from the first phase diversity parameters; a cross correlation unit configured to determine if a Co-C situation has occurred by being configured to cross correlate the currently preferred signal and another currently preferred signal and in case the currently preferred and the other preferred signal are uncorrelated, configured to determine that Co-C situation has occurred.

A sixth example system may include one or more of the first through the fifth example systems, wherein the first correlation unit is configured to calculate a first auto correlation function of the two input signals; and wherein the second correlation unit is configured to calculate a second auto correlation function of the two other input signals. A seventh example system may include one or more of the first through the sixth example systems, the controller further being configured to compare the consistency value of the first and the second correlations with a predetermined threshold and in case the consistency value of the first and the second correlations is less than the predetermined threshold and in case the FM broadcast signals include RDS data, the controller is configured to switch at least one of the FM broadcast signals to an alternative frequency in accordance with RDS PI code. An eighth example system may include one or more of the first through the seventh example systems, wherein the at least two antennas are spaced at least ½ wavelength of an associated operating frequency of the at least two antennas. One or more of the first through the eighth example systems may be configured as, comprise, and/or include an infotainment system installed in a vehicle.

All previously discussed embodiments are not intended as limitations but serve as examples illustrating features and advantages of the disclosure. It is to be understood that some or all of the above described features may also be combined in different ways.

The invention claimed is:

1. A method for reception improvement of an FM tuner receiving at least a first and a second FM broadcast signal, in a common channel interference, Co-C, situation, comprising:
   providing a first and a second FM front-end outputting a first signal and a second signal, respectively, corresponding to the received first and second FM broadcast signals;
   selecting a currently preferred signal based on the first and the second signal;
   outputting the currently preferred signal as an IF signal;
   providing a previously preferred signal by delaying the currently preferred signal;

wherein selecting the currently preferred signal based on the first and the second signal comprises determining if a Co-C situation has occurred and:
  if it is determined that a Co-C situation has not occurred, determining a first phase diversity comprising first phase diversity parameters based on the first and the second signal; and selecting the currently preferred signal based on a result of the first phase diversity determination; and
  if it is determined that a Co-C situation has occurred, calculating a first correlation of two input signals, wherein a first input signal is based on the previously preferred signal and a second input signal is based on the first signal, and calculating a second correlation of two other input signals, wherein a first other input signal is based on the previously preferred signal and a second other input signal is based on the second signal, and selecting the currently preferred signal of the first and the second signal based on which of the first and the second correlation shows a larger correlation value; and
wherein the method further comprises:
  providing a predetermined threshold for the correlation value for the calculating of the first correlation of the two input signals and the second correlation of the two other input signals respectively; and
  in a case when both the correlation values of the first and the second correlation are below the predetermined threshold, switching at least one of the FM broadcast signals to an alternative frequency.

2. The method according to claim 1, wherein selecting the currently preferred signal based on the first and the second signal comprises determining if a Co-C situation has not occurred; determining the first phase diversity comprising first phase diversity parameters based on the first and the second signal; and selecting the currently preferred signal based on the result of the determined first phase diversity; and
  if it is determined that a Co-C situation has occurred, selecting the currently preferred signal based on the result of the determined first phase diversity and by allowing a continuous change of the first phase diversity parameters.

3. The method according to claim 2, further comprising:
providing the previously preferred signal by delaying the currently preferred signal; and
wherein selecting the currently preferred signal based on the first and the second signal further comprises:
  if it is determined that a Co-C situation has occurred, calculating the first correlation of the two input signals, wherein the first input signal is based on the previously preferred signal and the second input signal is based on the first signal, and calculating the second correlation, wherein the second correlation is based on the two other input signals, wherein the first other input signal is based on the previously preferred signal and the second other input signal is based on the second signal, and selecting the currently preferred signal of the first and the second signal based on which of the first and the second correlation shows the larger correlation value.

4. The method according to claim 2, wherein determining if a Co-C situation has occurred comprises:
determining a second phase diversity comprising second phase diversity parameters, based on the first and the second signal; wherein the second phase diversity parameters are different from the first phase diversity parameters; and selecting another currently preferred signal based on a result of the second phase diversity; and
cross-correlating the currently preferred signal and the other currently preferred signal and if the cross-correlating shows that the currently preferred signal and the other currently preferred signal are uncorrelated, determining that Co-C situation has occurred.

5. The method according to claim 1, wherein determining if a Co-C situation has occurred comprises cross-correlating the first and second signals and in a case in which the cross-correlating shows that the first and second signals are uncorrelated, determining that a Co-C situation has occurred.

6. The method according to claim 1, wherein calculating the first correlation of the two input signals comprises calculating an auto correlation function of the two input signals; and wherein calculating the second correlation of the two other input signals comprises calculating an auto correlation function of the two other input signals.

7. The method according to claim 1, further comprising:
in case the FM broadcast signals include RDS data, switching the at least one of the FM broadcast signals to the alternative frequency in accordance with RDS PI code.

8. A system for reception improvement of an FM tuner receiving at least a first and a second FM broadcast signal, in a common channel interference, Co-C, situation, the system comprising:
  an FM tuner comprising at least two antennas and two FM front-ends, one per antenna, configured to output a first signal and a second signal, respectively, corresponding to the received first and second FM broadcast signals; and
  a Digital Signal Processor, DSP, comprising:
    a first phase diversity processor configured to determine a first phase diversity comprising first phase diversity parameters based on the first and the second signal; and configured to select a currently preferred signal based on a result of the first phase diversity if a Co-C situation has not occurred;
    a delay line configured to delay the currently preferred signal and to provide the delayed currently preferred signal as a previously preferred signal;
    a first correlation unit configured to calculate a first correlation of two input signals, wherein a first input signal is based on the previously preferred signal and a second input signal is based on the first signal if a Co-C situation has occurred;
    a second correlation unit configured to calculate a second correlation of two other input signals, wherein a first other input signal is based on the previously preferred signal and a second other input signal is based on the second signal, if a Co-C situation has occurred; and
    a controller configured to select the currently preferred signal of the first and the second signal based on which of the first and the second correlation shows a larger correlation value, if a Co-C situation has occurred;
    the controller further being configured to compare the correlation value of the first and the second correlation with a predetermined threshold and, in a case in which the correlation value of the first and the second correlation is less than the predetermined threshold, the controller is configured to switch at least one of the FM broadcast signals to an alternative frequency.

9. The system according to claim 8, the DSP further comprising a cross-correlation unit configured to determine if a Co-C situation has occurred by being configured to cross-correlate the first and the second signal, and in a case in which the first and the second signal are uncorrelated, configured to determine that a Co-C situation has occurred.

10. The system according to claim 8, wherein the first correlation unit is configured to calculate a first auto correlation function of the two input signals; and wherein the second correlation unit is configured to calculate a second auto correlation function of the two other input signals.

11. The system according to claim 8, wherein, in a case in which the FM broadcast signals include RDS data, the controller is further configured to switch the at least one of the FM broadcast signals to the alternative frequency in accordance with RDS PI code.

12. A system for reception improvement of an FM tuner receiving at least a first and a second FM broadcast signal, in a common channel interference, Co-C, situation, the system comprising:
an FM tuner comprising at least two antennas and two FM front-ends, one per antenna, configured to the first and second received FM broadcast signals; and
a DSP comprising:
a first phase diversity processor configured to determine a first phase diversity comprising first phase diversity parameters based on the first and the second signal; and if a Co-C situation has not occurred, configured to select a currently preferred signal based on a result of the first phase diversity;
a controller configured to select the currently preferred signal based on the result of the determined first phase diversity and, if a Co-C situation has occurred, configured to allow only a continuous change of the first phase diversity parameters;
a delay line configured to delay the currently preferred signal and to provide the delayed currently preferred signal as a previously preferred signal;
a first correlation unit configured to calculate a first correlation of two input signals, wherein a first input signal is based on the previously preferred signal and a second input signal is based on the first signal, if a Co-C situation has occurred; and
a second correlation unit configured to calculate a second correlation of two other input signals, wherein a first other input signal is a based on the previously preferred signal and a second other input signal is based on the second signal, if a Co-C situation has occurred;
the controller being configured to select the currently preferred signal of the first and the second signal based on which of the first and the second correlation shows a larger correlation value, if a Co-C situation has occurred; and
the controller further being configured to compare the correlation value of the first and the second correlation with a predetermined threshold and, in a case in which the correlation value of the first and the second correlation is less than the predetermined threshold, the controller is configured to switch at least one of the FM broadcast signals to an alternative frequency.

13. The system according to claim 12, the DSP further comprising:
a second phase diversity processor configured to determine a second phase diversity comprising second phase diversity parameters, based on the first and the second signal; wherein the second phase diversity parameters are different from the first phase diversity parameters; and
a cross-correlation unit configured to determine if a Co-C situation has occurred by being configured to cross-correlate the currently preferred signal and another currently preferred signal and in a case in which the currently preferred and the other currently preferred signal are uncorrelated, configured to determine that Co-C situation has occurred.

14. The system according to claim 12, wherein the first correlation unit is configured to calculate a first auto correlation function of the two input signals; and wherein the second correlation unit is configured to calculate a second auto correlation function of the two other input signals.

15. The system according to claim 12, wherein, in a case in which the FM broadcast signals include RDS data, the controller is further configured to switch the at least one of the FM broadcast signals to the alternative frequency in accordance with RDS PI code.

16. The system according to claim 12, wherein the system includes an infotainment system in a vehicle, and wherein the at least two antennas are spaced at least ½ wavelength of an associated operating frequency of the at least two antennas.

* * * * *